(12) United States Patent
Wang

(10) Patent No.: US 9,419,614 B2
(45) Date of Patent: Aug. 16, 2016

(54) LOW-POWER OPEN-CIRCUIT DETECTION SYSTEM

(71) Applicant: FREESCALE SEMICONDUCTOR, INC., Austin, TX (US)

(72) Inventor: Yong Wang, Shanghai (CN)

(73) Assignee: FREESCALE SEMICONDUCTOR, INC., Austin, TX (US)

(\*) Notice: Subject to any disclaimer, the term of this patent is extended or adjusted under 35 U.S.C. 154(b) by 0 days.

(21) Appl. No.: 14/843,997

(22) Filed: Sep. 3, 2015

(65) Prior Publication Data

US 2016/0211843 A1 Jul. 21, 2016

(30) Foreign Application Priority Data

Jan. 16, 2015 (CN) .............................. 201510101463

(51) Int. Cl.

| | |
|---|---|
| *G06F 21/00* | (2013.01) |
| *H03K 19/003* | (2006.01) |
| *H03K 5/125* | (2006.01) |
| *H03K 3/84* | (2006.01) |
| *G06F 21/86* | (2013.01) |
| *G06F 21/87* | (2013.01) |

(52) U.S. Cl.
CPC .............. *H03K 19/003* (2013.01); *G06F 21/86* (2013.01); *G06F 21/87* (2013.01); *H03K 3/84* (2013.01); *H03K 5/125* (2013.01)

(58) Field of Classification Search
CPC ..... H03K 3/84; H03K 5/125; H03K 17/9502; H03K 19/003; G06F 21/86; G06F 21/87
USPC .................................. 326/30, 56–58; 710/302
See application file for complete search history.

(56) References Cited

U.S. PATENT DOCUMENTS

| | | | |
|---|---|---|---|
| 5,389,738 A | 2/1995 | Piosenka et al. | |
| 5,506,566 A * | 4/1996 | Oldfield | G08B 13/128 340/550 |
| 6,452,283 B2 * | 9/2002 | Smola | H01L 23/576 257/297 |
| 6,496,119 B1 * | 12/2002 | Otterstedt | G06F 21/71 340/635 |
| 7,180,008 B2 | 2/2007 | Heitmann et al. | |
| 7,498,644 B2 | 3/2009 | Shapiro et al. | |
| 7,551,098 B1 * | 6/2009 | Chock | G08B 29/08 174/50 |
| 7,615,416 B1 | 11/2009 | Chock | |
| 7,868,441 B2 | 1/2011 | Eaton et al. | |

(Continued)

OTHER PUBLICATIONS

Cesar, "Infiineon/ST Mesh Comparison", Ioactive Labs, http://ioactiive.com/2010/02/infineon-st-mesh-comparison.html, Feb. 14, 2010.

*Primary Examiner* — Jason M Crawford
*Assistant Examiner* — Kurtis R Bahr
(74) *Attorney, Agent, or Firm* — Charles E. Bergere

(57) ABSTRACT

An open-circuit detection system for an integrated circuit (IC) includes a wire (e.g., part of a wire mesh for device protection) and circuitry for detecting open-circuit conditions in the wire. A first signal generator (e.g., a linear-feedback shift register) applies a binary sequence to a first end of the wire. Switched resistors are connected between a second end of the wire and both a voltage supply and ground. A comparator compares the binary sequence and a signal based on the voltage at the second end of the wire to check for the open-circuit condition. Logic circuitry closes one of the first and second switches as a function of a value in the binary sequence. The comparator checks for the open-circuit condition in the wire randomly and intermittently, which reduces power consumption.

15 Claims, 3 Drawing Sheets

(56) References Cited

U.S. PATENT DOCUMENTS

| | | |
|---|---|---|
| 7,923,830 B2 | 4/2011 | Pope et al. |
| 7,947,911 B1 | 5/2011 | Pham et al. |
| 8,240,038 B1 | 12/2012 | Pham et al. |
| 8,884,757 B2 * | 11/2014 | Sasson .................. G08B 13/22 340/5.7 |
| 8,896,086 B1 * | 11/2014 | Arora ...................... G06F 21/86 257/428 |
| 9,323,957 B2 * | 4/2016 | A/L Krishnasamy .. G06F 21/86 |
| 2002/0002683 A1 | 1/2002 | Benson |
| 2003/0008432 A1 | 1/2003 | Kux |
| 2004/0227205 A1 | 11/2004 | Walmsley |
| 2006/0231633 A1 * | 10/2006 | Farooq ............. G06K 19/07381 235/492 |
| 2008/0186172 A1 * | 8/2008 | Thompson ............... H05C 3/00 340/541 |
| 2008/0251906 A1 * | 10/2008 | Eaton .................. H01L 25/0655 257/686 |
| 2009/0077669 A1 | 3/2009 | Buer |
| 2013/0104252 A1 * | 4/2013 | Yanamadala ........... G06F 21/76 726/34 |
| 2013/0285833 A1 * | 10/2013 | Oswalt .................. G08C 19/16 340/870.02 |

* cited by examiner

FIG. 2 -PRIOR ART-

LOW-POWER OPEN-CIRCUIT DETECTION SYSTEM

BACKGROUND

The present invention relates to securing electronic components and data in integrated circuits from unauthorized access and, more particularly, to securing electronic components and data using tamper-detection systems, devices, and techniques.

A packaged integrated circuit (IC) device incorporating a wire-mesh protection system may be used in automated teller machines (ATMs) or electronic point-of-sale (ePOS) terminals to process credit and/or debit card information. The packaged IC device also may be used to store and utilize cryptographic keys for applications requiring cryptographic operations (e.g., set-top converter boxes).

FIG. 1 is a simplified, exploded, isometric view of a packaged IC device 100 having a passive wire-mesh protection system. The device 100 includes a ground plane 102, an upper wire mesh 104, one or more layers 106 of protected integrated circuitry, a lower wire mesh 110, and a substrate 112. Although not explicitly shown in FIG. 1, in addition to conventional logic and memory to be protected, the layers 106 may include detection circuitry for detecting incidents of tampering and control circuitry for responding to the detection of such incidents.

The upper wire mesh 104 enables detection of an attempt to physically breach the device 100 from the top to access the protected layers 106. Similarly, the lower wire mesh 110 enables detection of an attempt to physically breach the device 100 from the bottom to access the protected layers 106.

Wire-mesh protection systems, such as that used in the packaged IC device 100 of FIG. 1, operate by detecting open-circuit or short-circuit conditions in wire meshes, such as the wire meshes 104 and 110 that are created when a hacker drills into a packaged IC device. Upon detection of an open or shorted line in the wire mesh, control logic clears the memory of the packaged IC device and/or causes the device to power down and stop processing data. For example, if the packaged IC device stores credit card numbers or cryptographic keys in memory, then this data may be deleted to ensure that sensitive data is not divulged. It is to be appreciated by persons skilled in the art that protection systems described herein may be used to protect any type of control logic, integrated circuit, or device storing secure or sensitive data.

FIG. 2 is a component-level diagram of a passive wire-mesh tamper-detection system 200 that may be used in the tamper protection system of the package IC device 100 of FIG. 1, as is typified, by way of hypothetical example. The wire-mesh tamper-detection system 200 comprises a wire mesh 210, such as the upper wire mesh 104 or the lower wire mesh 110 of FIG. 1, and tamper-detection circuitry 220, which may be implemented in the protected layers 106 of FIG. 1.

The wire mesh 210 has two wire leads 212a and 212b, illustrated in a rectangular serpentine pattern. Lead 212a is connected in series with a pull-down resistor 214a between a ground node 216 and an input port 222a of the tamper-detection circuitry 220. Similarly, the lead 212b is connected in series with a pull-up resistor 214b between a DC voltage source 218 (such as a battery) having a DC voltage level VBAT and an input port 222b of the tamper-detection circuitry 220. In one implementation, the serpentine leads 212a and 212b are electrically isolated from one another in two adjacent mesh layers.

Within the tamper-detection circuitry 220, the input port 222a is connected via the node 224a to both a de-glitch circuit 226a and a DC voltage source 228 (also having DC voltage level VBAT) via a pull-up resistor 230a. Similarly, the input port 222b is connected via the node 224b to both a de-glitch circuit 226b and a ground node 232 via a pull-down resistor 230b.

This arrangement effectively establishes two constant direct currents flowing through the wire mesh 210 that travel in opposite directions through the leads 212a and 212b, respectively. During normal operation, the two respective constant currents establish two predictable, ideal voltage levels at the nodes 224a and 224b based on the voltage level VBAT and the resistance levels of the resistors 214a, 214b, 230a, and 230b.

The signals at the nodes 224a and 224b are processed by the de-glitch circuits 226a and 226b, respectively, and applied to the comparator circuits 234a and 234b, respectively. The de-glitch circuits 226a and 226b filter out spurious voltage levels in the analog signals 224a and 224b.

Each comparator circuit 234a, 234b compares its corresponding voltage level 224a, 224b with an appropriate reference voltage level (not shown) that is equal to the ideal voltage level at the corresponding node 224a, 224b. As long as both of the voltage levels 224a, 224b are within the designed tolerances of the ideal voltage levels, the comparator circuits 234a, 234b generate the digital output signals 236a, 236b having logic values that indicate that there are no short-circuit or open-circuit conditions in the mesh 210. Otherwise, one or both of the comparator circuits 234a, 234b will generate one or both of the output signals 236a, 236b having logic values that indicate that a short or open circuit condition exists in the mesh 210.

When detectable tampering occurs, the wire mesh 210 will have either a short-circuit condition (i.e., the lead 212a is shorted with the lead 212b) or an open-circuit condition (i.e., one or both of the leads 212a, 212b are broken). Under either scenario, voltages at one or both of the nodes 224a and 224b will be sufficiently altered from their desired levels such that one or both of the comparators 234a and 234b will detect the short/open-circuit condition. Shut-down or even destruction procedures may then be implemented by the control circuitry.

For example, if an open-circuit condition exists in the lead 212a, then the voltage at the node 224a will be pulled high towards the voltage level VBAT. Similarly, if an open-circuit condition exists in the lead 212b, then the voltage at the node 224b will be pulled low towards ground. If a short-circuit condition exists between the leads 212a and 212b, then the voltages at the nodes 224a and 224b will both be a level determined by the voltage level VBAT and the resistances of the resistors 230a and 230b. By selecting appropriate values for the voltage level VBAT and the resistances of the resistors 214a, 214b, 230a, and 230b, the tamper-detection system 200 can be designed to detect each of these different situations resulting from tampering.

Although the resistors 230a and 230b may be implemented within the integrated circuitry that is protected by the tamper-detection system 200, the resistors 214a and 214b are implemented off chip.

The wire-mesh tamper-detection system 200 of FIG. 2 suffers in that the signals used to determine whether a tamper condition has occurred in the wire mesh 210 are always present and therefore require a constant draw of power from the voltage sources 218 and 228. This power draw limits applications of wire-mesh tamper-detection systems, and requires higher cost for powering the system 200, but also higher manufacturing costs, for example, when large resistors are employed, which demand greater area for implementation.

BRIEF DESCRIPTION OF THE DRAWINGS

Other embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Problems in the prior art are addressed in accordance with the principles of the present invention by implementing a low-power, active, tamper-detection system that checks for open-circuit conditions at intermittent, random intervals, thereby reducing power usage, and enabling the use of smaller resistors than are typically used in conventional systems.

In one embodiment, the present invention is a detection circuit for detecting an open-circuit condition in a wire used for device security. A first signal generator generates and applies a binary sequence to a first end of the wire. A first series combination of a first resistor and a first switch is connected between a voltage supply node and a second end of the wire. A second series combination of a second resistor and a second switch is connected between the second end of the wire and a ground node. Comparator circuitry compares the binary sequence generated by the first signal generator and a signal based on the voltage at the second end of the wire to check for an open-circuit condition in the wire. Logic circuitry receives the binary sequence from the first signal generator and closes one of the first and second switches as a function of a value in the binary sequence. The comparator circuitry checks for the open-circuit condition in the wire intermittently only when one of the first and second switches is closed by the logic circuitry.

Figure 1:
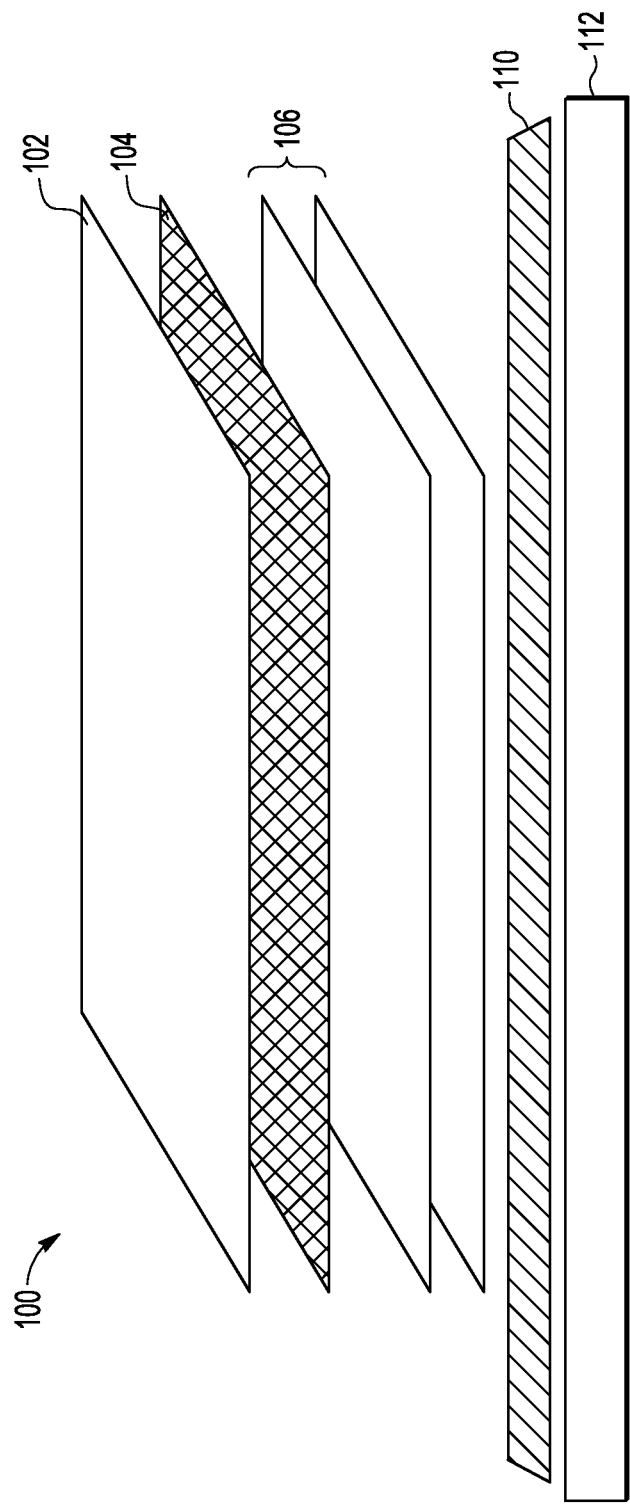
FIG. 1 is a simplified, exploded, isometric view of a packaged IC device having a conventional passive wire-mesh protection system.
Figure 2:
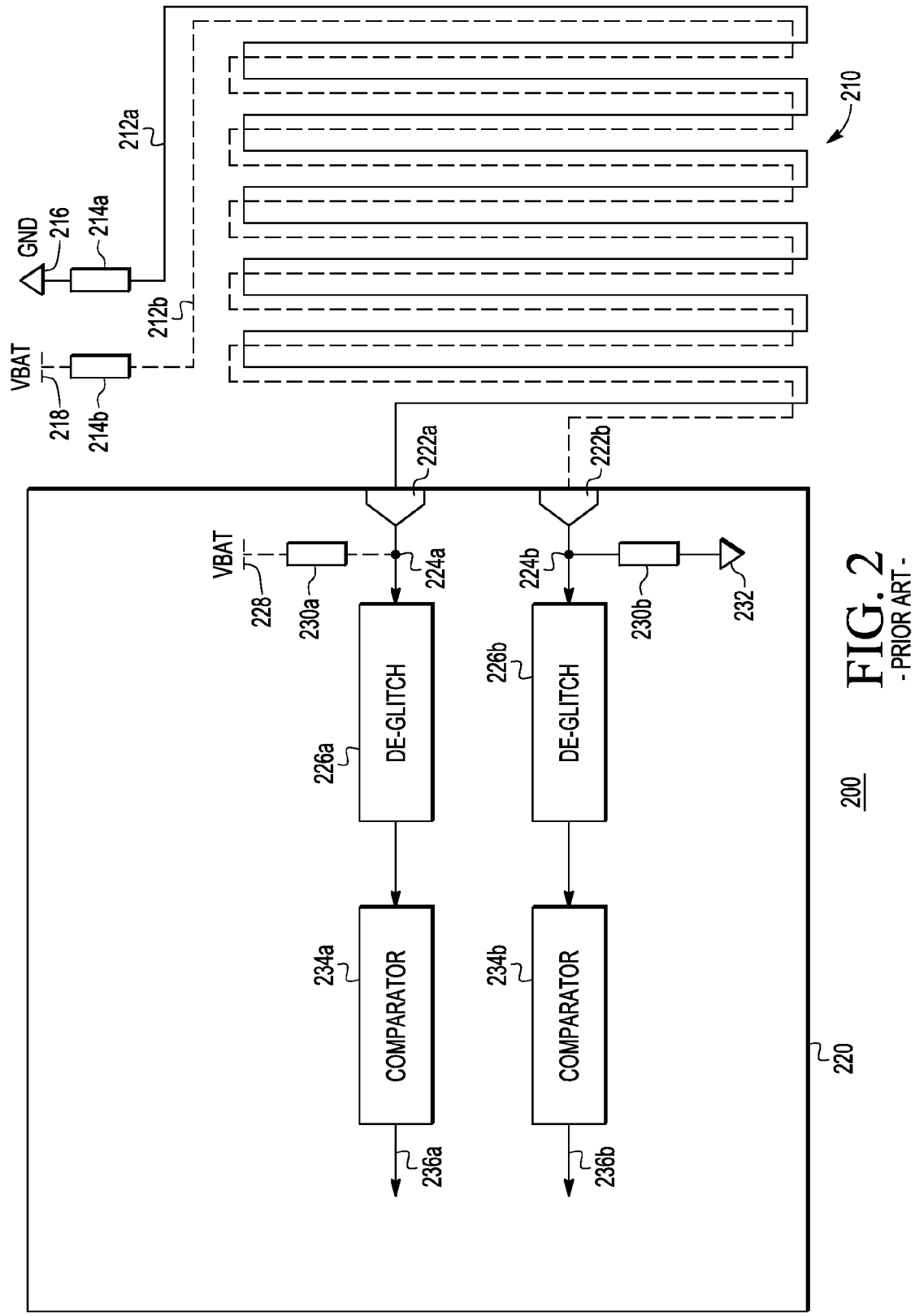
FIG. 2 is a component-level diagram of a conventional passive wire-mesh tamper-detection system that may be used in the tamper protection system of the packaged IC device of FIG. 1.
Figure 3:
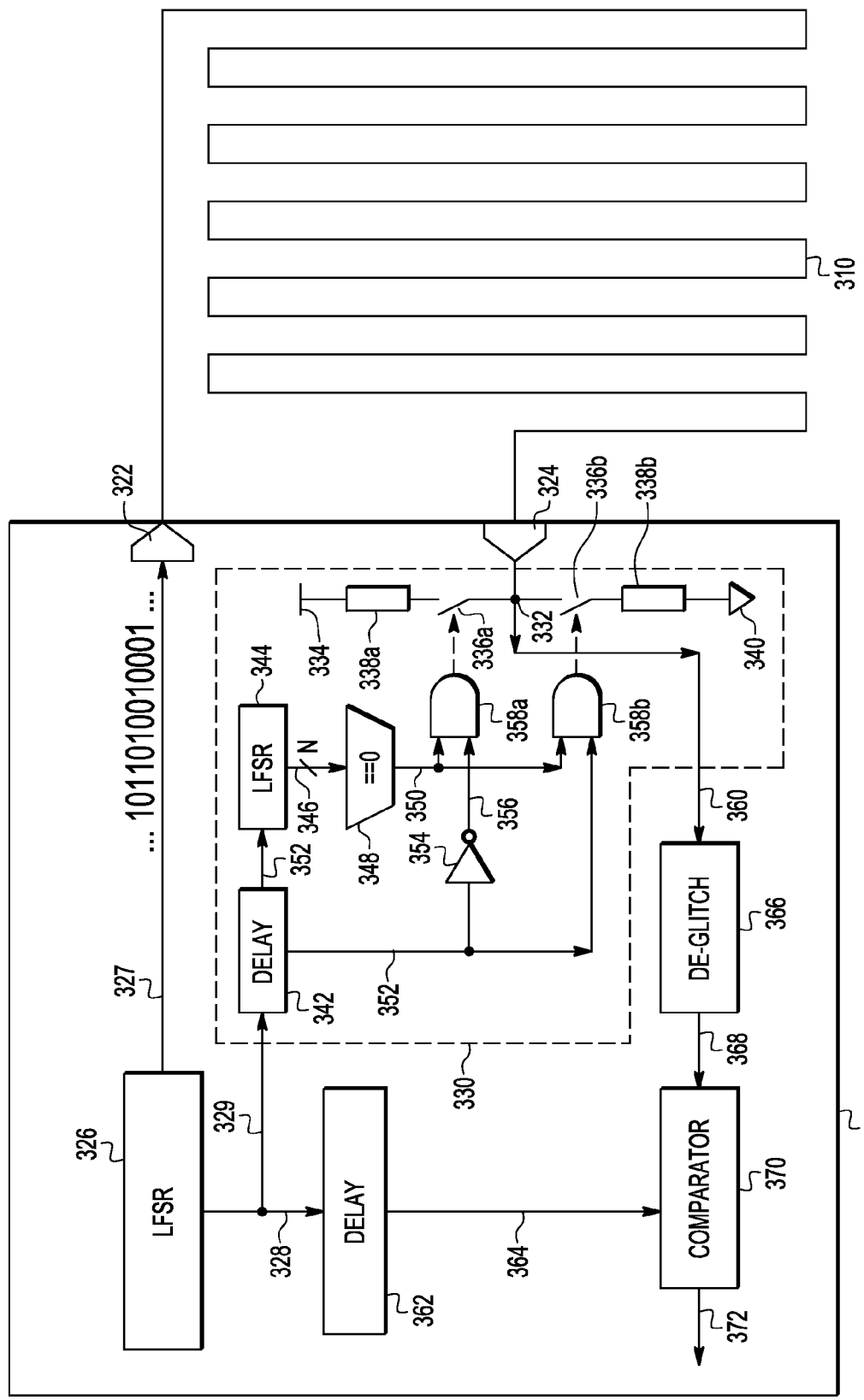
FIG. 3 is a component-level diagram of an exemplary low-power, active, open-circuit detection system, in accordance with particular embodiments of the presently disclosed invention.

Referring now to FIG. 3, a schematic block diagram of an exemplary low-power, active, open-circuit detection system 300 in accordance with particular embodiments of the invention is shown. The detection system 300 comprises a wire 310 and open-circuit detection circuitry 320 that detects an open-circuit condition in the wire 310. The detection system 300 can be implemented as part of a tamper-protection system that also includes a suitable wire-mesh tamper-detection system (not shown) that is designed to detect a short-circuit condition within a wire mesh, which may include the wire 310. The open-circuit detection circuitry 320 may be, but does not have to be, implemented within the layers of IC circuitry (analogous to the layers 106 of FIG. 1) that are protected by such a tamper-protection system.

In one embodiment, the wire 310 comprises a single, serpentine lead running from an output port 322 to an input port 324 of the open-circuit detection circuitry 320. The wire 310 need not have a serpentine shape, as other shapes may suffice in protecting an integrated circuit, and thus the wire 310 may be laid out in most any shape. The wire 310 also may be implemented in only one layer of an integrated circuit or in multiple layers of an integrated circuit.

The open-circuit detection circuitry 320 comprises a first digital signal generator 326 (e.g., without limitation, a linear-feedback shift register (LFSR)), a detection logic module 330, a first delay circuit 362, a de-glitch circuit 366, and a comparator circuit 370. The detection logic module 330 comprises components that detect an open-circuit condition in the wire 310 in accordance with the techniques discussed below.

The de-glitch circuit 366 resolves noise or uncertainty in an analog signal 360 received at the input port 324 before it is input into the comparator circuit 370 as a de-glitched signal 368. The comparator circuit 370 compares the de-glitched signal 368 with a signal 364 that is output by the first delay circuit 362. The comparator circuit 370 identifies a defined equality (and/or inequality) condition between the two signals 364 and 368.

The LFSR 326 generates a pseudo-random stream of binary values that propagates through the system 300 via different leads. More particularly, the LFSR 326 outputs the binary stream on a lead 327, which carries the binary stream to the output port 322 and then to the wire 310, which, under normal operating conditions, presents the same signal back to the detection logic module 330 via the input port 324. A lead 328 carries the same binary stream output of the LFSR 326 to the first delay circuit 362, which then passes a corresponding delayed signal 364 to the comparator circuit 370. Yet another lead 329 carries the binary stream output of the LFSR 326 to the detection logic module 330, which produces the analog signal 360 that indicates, at random, intermittent times, the condition of the wire 310, as discussed below.

The de-glitch circuit 366 receives the analog signal 360 and generates the de-glitched signal 368 that is input to the comparator circuit 370 for comparison with the delayed signal 364. The first delay circuit 362 delays the binary stream signal on the lead 328 for precisely the duration of time it takes for the binary stream signal on the lead 327 to traverse the wire 310, the detection logic module 330, and the de-glitch circuit 366 so that the de-glitched signal 368 is synchronized with the delayed signal 364 generated by the delay circuit 362. The delay circuit 362 comprises any circuitry capable of creating delays for coordinating signal transmission through IC components, such as a string of buffers, as is known in the art. As such, when the comparator circuit 370 compares the signals 364 and 368, it is comparing appropriately synchronized information, i.e., bits originating from the LFSR 326 on the same master clock cycle.

Within the detection logic module 330, the signal received from the wire 310 at the input port 324 is applied to a node 332, which is connected to (i) a DC voltage supply 334 by way of a first switch 336*a* and a pull-up resistor 338*a* and to (ii) a ground node 340 by way a second switch 336*b* and a pull-down resistor 338*b*. Note that, in alternative implementations, the order of the series-connected switches and resistors could be reversed, such that (i) the resistor 338*a* is between the switch 336*a* and the node 332 and/or (ii) the resistor 338*b* is between the switch 336*b* and the node 332.

The switches 336*a* and 336*b* are controlled by AND gates 358*a* and 358*b*. As discussed below, the switches 336*a* and 336*b* are not in a closed position at the same time, and hence current will never flow from the voltage supply 334 to the ground node 340 via the node 332, thereby achieving one of several improvements over the prior art.

The detection logic module 330 includes a second delay circuit 342 that receives the bit stream output by the first LFSR 326 by way of the lead 329 and adds a predetermined delay to the bit stream and outputs a delayed bit stream on a lead 352. The detection logic module 330 also has a second digital signal generator 344 generates a random or pseudo-random sequence of N-bit values 346. When the digital signal generator 344 is a second LFSR, the N-bit value 346 corresponds to the N least-significant bits (LSBs) generated by the second LFSR 344. The edge of the delayed bit stream on the lead 352 is used as a re-seed function for the LFSR 344. The N-bit signal 346 is applied to a N-bit comparator 348, which generates a 1-bit signal 350, whose value is logic 1 when all N bits in the N-bit value 346 are equal to logic 0. Otherwise, the value of the signal 350 is logic 0.

The detection logic module 330 also has an inverter 354 that receives the delayed binary signal 352 and inverts it to generates an inverted binary signal 356.

The AND gate 358*a* controls the state of the switch 336*a* based on the 1-bit signal 350 output by the comparator 348 and the inverted binary signal 356. When both of the signals 350 and 356 are high, the switch 336*a* is closed, and the node 332 is connected to the voltage supply 334 via the pull-up resistor 338*a*. Otherwise, the switch 336*a* is open, and the node 332 is isolated from the voltage supply 334.

Similarly, the AND gate 358*b* controls the state of the switch 336*b* based on the 1-bit signal 350 and the delayed bit stream on the lead 352. When both of the inputs to the AND gate 358*b* are high (logic 1), the switch 336*b* is closed, and the node 332 is connected to the ground node 340 via the pull-down resistor 338*b*. Otherwise, the switch 336*b* is open, and the node 332 is isolated from the ground node 340.

Because the AND gates 358*a* and 358*b* are controlled by the complementary binary signals 352 and 356, the outputs of the AND gates 358*a* and 358*b* will never both be high at the same time and, as a result, the switches 336*a* and 336*b* will never be closed at the same time.

The delay circuit 342 is designed to ensure that the timing of the binary signal transmitted over the wire 310 and arriving at the node 332 from the input port 324 is synchronized with the closing of either the switch 336*a* or 336*b* as a result of the processing of the corresponding bit value in the binary signal on the lead 329 input to the detection logic module 330.

When the output of the first LFSR 326 is 1, then the output of the AND gate 358*a* will always be low, the switch 336*a* will always be open, and the node 332 will always be disconnected from the supply voltage 334. However, when the output of the first LFSR 326 is 1, then the output of the AND gate 358*b* will intermittently be high depending on the output 346 of the second LFSR 344 having all 0 bits, which in turn will close the switch 336*b* and connect the node 332 to the ground node 340.

With the switch 336*b* closed, the voltage at the node 332 will be determined by the logic 1 value received at the input port 324. As a result, the comparator circuit 370 will determine that the high logic state of the de-glitched signal 368 received from the de-glitch circuit 366 corresponds to the logic 1 value in the delayed binary signal 364 received from the delay circuit 362, and the comparator circuit 370 will generate a detection signal 372 indicating that no open-circuit condition was detected in the wire 310. Note that, when the switch 336*b* is closed, some current will flow through the pull-down resistor 338*b* to the ground node 340.

Conversely, when the output of the LFSR 326 is 0, then the output of the AND gate 358*b* will be low, the switch 336*b* will be open, and the node 332 will be disconnected from the ground node 340. However, when the output of the LFSR 326 is 0, then the output of the AND gate 358*a* will be intermittently high in accordance with the output 346 of the LFSR 344 having all 0 bits, which in turn will close the switch 336*a* and connect the node 332 to the voltage supply 334.

With the switch 336*a* closed, the voltage at the node 332 will be determined by the logic 0 value received at the input port 324. As a result, the comparator circuit 370 will determine that the low logic state of the de-glitched signal 368 received from the de-glitch circuit 366 corresponds to the logic 0 value in the delayed binary signal 364 received from the delay circuit 362, and the comparator circuit 370 will generate a value for the detection signal 372 indicating that no open-circuit condition was detected in the wire 310. Note that, when the switch 336*a* is closed, some current will flow from the voltage supply 334 through the pull-up resistor 338*a*.

Note that, when the N-bit value 346 is not all zeros, then the logic signal 350 generated by the comparator 348 will be low. In that case, the outputs from the AND gates 358*a* and 358*b* will both be low, independent of the values of the binary signals 352 and 356. As a result, both the switches 336*a* and 336*b* will be open, and the node 332 will be isolated from both the voltage supply 334 and the ground node 340. As such, the voltage level at the node 332 will be determined solely by the binary signal at the input port 324 from the wire 310. Here, too, the comparator circuit 370 will determine that the de-glitched signal 368 matches the delayed binary signal 364, whether the delayed binary signal 364 is a 1 or a 0, and no open-circuit condition will be detected. During these times, minimal power is consumed by the open-circuit detection system 300.

The open-circuit detection system 300 is designed to detect the occurrence of an open-circuit condition in the wire 310 created, for example, when a hacker inserts a probe into the packaged device and breaks the wire 310. In that case, if the LFSR 326 output is 1, when the switch 336*b* is intermittently closed, the voltage at the node 332 will be driven towards ground through the pull-down resistor 338*b*. As such, the de-glitched signal 368 produced by the de-glitch circuit 366 will be low, the comparator 370 will detect a mismatch between the low de-glitched signal 368 and the delayed logic 1 signal 364, and the comparator circuit 370 will generate a value for the detection signal 372 indicating that an open-circuit condition was detected in the wire 310.

Similarly, if the LFSR 326 output is 0, when the switch 336*a* is intermittently closed, the voltage at the node 332 will be driven towards the voltage supply 334 level through the pull-up resistor 338a. As such, the de-glitched signal 368 produced by the de-glitch circuit 366 will be high, the comparator 370 will detect a mismatch between the high de-glitched signal 368 and the delayed logic 0 signal 364, and the comparator circuit 370 will again generate a value for the detection signal 372 indicating that an open-circuit condition was detected in the wire 310.

When implemented as an LFSR, the second digital signal generator 344 will generate a pseudo-random sequence with 1s and 0s occurring, on average, with equal frequency. As such, the value of N selected for the N-bit signal 346 determines how often, on average, the N-bit signal 346 will be all zeros and therefore how often the corresponding switch 336a or 336b (depending on the value of the binary signal 329) will be closed. If N=1, then, on average, one of the switches 336a, 336b will be closed half of the time. If N=2, then, on average, one of the switches 336a, 336b will be closed one quarter of the time. For a generic value N, on average, one of the switches 336a, 336b will be closed $\frac{1}{2}^N$ of the time.

The greater the value of N, the less frequently will one of the switches 336a, 336b be closed, and the less power will be consumed by the open-circuit detection system 300. On the other hand, the smaller the value of N, the faster, on average, will the open-circuit detection system 300 be able to detect the occurrence of an open-circuit condition in the wire 310. The designer of a particular implementation of the open-circuit detection system 300 can trade off these two considerations when selecting a value for N.

The pseudo-random nature of the values generated by the LFSRs 326 and 344 make it difficult for a hacker to thwart the effectiveness of the open-circuit detection system 300 by trying to predict and mimic the signals generated within the system 300.

When the open-circuit detection circuitry 320 is implemented within an integrated circuit being protected by the open-circuit detection system 300, the resistors 338a and 338b are implemented on chip, and the open-circuit detection system 300 requires no off-chip resistors. Moreover, smaller resistors 338a and 338b may be used in such a configuration than in the prior art, and hence the integrated circuitry for the open-circuit detection system 300 can be easier to design and more economical to manufacture than in the prior art.

Note that the voltage supply 334 may be powered from on or off chip. When powered from off chip, the open-circuit detection system 300 can still operate even when the protected integrated circuit is powered down.

Although the invention has been described in the context of the open-circuit detection system 300 in which the first digital signal generator 326 is an LFSR that generates a pseudo-random binary sequence, in alternative embodiments, the first digital signal generator 326 may be implemented using other suitable types of signal generators that generate random, pseudo-random, or even non-random binary sequences.

Although the invention has been described in the context of the open-circuit detection system 300 in which the detection logic module 330 has the combination of the LFSR 344 and the comparator 348 that randomly and intermittently determines that one of the switches 336a, 336b should be closed, in alternative embodiments, other suitable combinations of circuitry may be implemented to make intermittent determinations that are (pseudo-)random or non-random. Intermittent determinations, whether they are (pseudo-)random or non-random, are sufficient to reduce power consumption. Intermittent determinations that are also (pseudo-)random make it harder for a hacker to thwart the protection scheme.

Although the invention has been described in the context of the open-circuit detection system 300 in which the detection logic module 330 has a particular combination of logic devices including the inverter 354 and the AND gates 358a, 358b that control the states of the switches 336a, 336b, in alternative embodiments, other suitable combinations of logic devices may be implemented to control the switch states.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding nodes, ports, or paths may be referred to by the same name and are interchangeable for purposes here.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

The invention claimed is:

1. Detection circuitry for detecting an open-circuit condition in a wire, the detection circuitry comprising:
   a first signal generator that generates and applies a binary sequence to a first end of the wire;
   a first series combination of a first resistor and a first switch connected between a voltage supply node and a second end of the wire;
   a second series combination of a second resistor and a second switch connected between the second end of the wire and a ground node;
   comparator circuitry that compares (i) the binary sequence generated by the first signal generator and (ii) a signal based on the voltage at the second end of the wire to check for an open-circuit condition in the wire; and logic circuitry that receives the binary sequence from the first signal generator and closes one of the first and second switches as a function of a value in the binary sequence, wherein the comparator circuitry checks for the open-circuit condition in the wire only when one of the first and second switches is closed by the logic circuitry.

2. The detection circuitry of claim 1, wherein the logic circuitry allows only one of the first and second switches to be closed at a time.

3. The detection circuitry of claim 1, wherein the comparator circuitry checks for the open-circuit condition in the wire randomly and intermittently only when one of the first and second switches is closed by the logic circuitry.

4. The detection circuitry of claim 1, wherein the binary sequence generated by the first signal generator is a random or pseudo-random binary sequence.

5. The detection circuitry of claim 4, wherein the first signal generator comprises a linear-feedback shift register (LFSR).

6. The detection circuitry of claim 1, wherein the comparator circuitry comprises:
a de-glitch circuit connected to receive and de-glitch the voltage at the second end of the wire to generate a de-glitched signal; and
a comparator connected to compare the binary sequence generated by the first signal generator and the de-glitched signal to check for the open-circuit condition in the wire.

7. The detection circuitry of claim 1, wherein the logic circuitry comprises:
a first AND gate connected to control the first switch based on a value in the binary sequence and a logic signal that intermittently allows one of the first and second switches to be closed; and
a second AND gate connected to control the second switch based on the value in the binary sequence and the logic signal.

8. The detection circuitry of claim 7, wherein the logic signal randomly and intermittently allows one of the first and second switches to be closed.

9. The detection circuitry of claim 7, wherein the logic circuitry further comprises an inverter connected to invert the value of the binary sequence applied to the first AND gate.

10. The detection circuitry of claim 7, wherein the logic circuitry further comprises:
a second signal generator that generates a random N-bit value; and
a second comparator that compares the random N-bit value to a specified N-bit value to generate the logic value, wherein the logic value allows one of the first and second switches to be closed only when the random N-bit value matches the specified N-bit value.

11. The detection circuitry of claim 10, wherein the specified N-bit value is all 0s.

12. The detection circuitry of claim 10, wherein the second signal generator is an LFSR that generates the random N-bit value based on N least significant bits within the LFSR.

13. The detection circuitry of claim 1, wherein the wire is part of a wire mesh used to provide security for an integrated circuit device.

14. The detection circuitry of claim 13, wherein the detection circuitry is implemented in protected layers of an integrated circuit die within the integrated circuit device.

15. The detection circuitry of claim 1, wherein:
the logic circuitry allows only one of the first and second switches to be closed at a time;
the comparator circuitry checks for the open-circuit condition in the wire randomly and intermittently only when one of the first and second switches is closed by the logic circuitry;
the binary sequence generated by the first signal generator is a random or pseudo-random binary sequence;
the first signal generator comprises a first LFSR;
the comparator circuitry comprises:
a de-glitch circuit connected to receive and de-glitch the voltage at the second end of the wire to generate a de-glitched signal; and
a first comparator connected to compare the binary sequence generated by the first signal generator and the de-glitched signal to check for the open-circuit condition in the wire;
the logic circuitry comprises:
a first AND gate connected to control the first switch based on the value in the binary sequence and a logic signal that randomly and intermittently allows one of the first and second switches to be closed;
a second AND gate connected to control the second switch based on the value in the binary sequence and the logic signal;
an inverter connected to invert the value of the binary sequence applied to the first AND gate;
a second LFSR that generates a random N-bit value based on N least significant bits within the LFSR; and
a second comparator that compares the random N-bit value to a specified N-bit value having all 0s to generate the logic value, wherein the logic value allows one of the first and second switches to be closed only when the random N-bit value has all 0s;
the wire is part of a wire mesh used to provide security for an integrated circuit device; and
the detection circuitry is implemented in protected layers of an integrated circuit within the integrated circuit device.

* * * * *